(12) United States Patent
Teteak

(10) Patent No.: US 9,402,164 B2
(45) Date of Patent: Jul. 26, 2016

(54) CONFIGURABLE TRAFFIC ZONE CONTROL SYSTEM

(71) Applicant: Continental Automotive Systems, Inc., Auburn Hills, MI (US)

(72) Inventor: David Teteak, Crystal Lake, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/521,975

(22) Filed: Oct. 23, 2014

(65) Prior Publication Data

US 2015/0045987 A1 Feb. 12, 2015

Related U.S. Application Data

(62) Division of application No. 13/328,907, filed on Dec. 16, 2011, now abandoned.

(51) Int. Cl.
| | | |
|---|---|---|
| H04W 4/02 | (2009.01) | |
| H04W 4/04 | (2009.01) | |
| B60K 31/00 | (2006.01) | |
| B60T 7/18 | (2006.01) | |
| G08G 1/0967 | (2006.01) | |
| B60W 10/06 | (2006.01) | |
| B60W 10/184 | (2012.01) | |
| G01S 19/01 | (2010.01) | |
| H04M 1/725 | (2006.01) | |
| H04W 4/06 | (2009.01) | |

(Continued)

(52) U.S. Cl.
CPC ............ *H04W 4/046* (2013.01); *B60K 31/0058* (2013.01); *B60T 7/18* (2013.01); *B60W 10/06* (2013.01); *B60W 10/184* (2013.01); *G01S 19/01* (2013.01); *G08G 1/096725* (2013.01); *G08G 1/096741* (2013.01); *G08G 1/096783* (2013.01); *H04M 1/72572* (2013.01); *H04M 1/72577* (2013.01); *H04W 4/06* (2013.01); *H04W 4/16* (2013.01); *H04W 4/22* (2013.01); *B60K 2031/0091* (2013.01); *B60W 2550/22* (2013.01)

(58) Field of Classification Search
USPC ......... 340/936, 905, 907, 917, 933, 943, 441, 340/901; 455/456.1, 456.2, 456.3, 456.5, 455/456.6, 457, 422.1, 418; 379/70; 701/117, 119, 70, 93, 78
See application file for complete search history.

(56) References Cited

U.S. PATENT DOCUMENTS

| | | | | | |
|---|---|---|---|---|---|
| 5,235,633 | A | * | 8/1993 | Dennison | ............ H04B 7/18541 342/357.29 |
| 5,590,217 | A | * | 12/1996 | Toyama | ................... G06K 9/46 348/149 |

(Continued)

FOREIGN PATENT DOCUMENTS

| | | |
|---|---|---|
| CN | 1622646 A | 6/2005 |
| CN | 101051418 A | 10/2007 |

(Continued)

*Primary Examiner* — Thomas Tarcza
*Assistant Examiner* — Richard Goldman

(57) ABSTRACT

A configurable traffic zone control system (14) includes transmitter structure (16) associated with a traffic zone (10). The transmitter structure includes a transmitter (18) for transmitting a wireless signal (20) indicative of a speed requirement of the traffic zone. Receiver structure (24) is provided in a vehicle (26) for receiving the wireless signal such that based on the wireless signal, speed of the vehicle is automatically controlled to be at or below the speed requirement while the vehicle is in the traffic zone.

12 Claims, 1 Drawing Sheet

(51) Int. Cl.
*H04W 4/16* (2009.01)
*H04W 4/22* (2009.01)

(56) References Cited

U.S. PATENT DOCUMENTS

| | | | | |
|---|---|---|---|---|
| 5,740,046 A * | 4/1998 | Elestedt | ............... | B61L 25/021 340/991 |
| 5,963,127 A * | 10/1999 | Lang | ............... | B60Q 9/008 180/167 |
| 6,011,973 A * | 1/2000 | Valentine | ............... | H04W 48/04 342/357.59 |
| 6,166,658 A * | 12/2000 | Testa | ............... | B60K 31/0058 340/932 |
| 6,204,778 B1 * | 3/2001 | Bergan | ............... | G08G 1/075 340/905 |
| 6,496,703 B1 * | 12/2002 | da Silva | ............... | H04W 48/04 379/70 |
| 6,718,175 B1 * | 4/2004 | Edstam | ............... | H04W 48/04 455/456.5 |
| 6,782,266 B2 * | 8/2004 | Baer | ............... | H04B 7/18506 455/421 |
| 7,181,229 B2 * | 2/2007 | Singh | ............... | H04M 1/66 455/456.4 |
| 7,272,403 B2 * | 9/2007 | Creamer | ............... | H04W 4/02 455/456.1 |
| 7,477,891 B1 * | 1/2009 | Pinault | ............... | H04M 1/72502 455/41.2 |
| 7,515,101 B1 * | 4/2009 | Bhogal | ............... | G01S 19/39 342/357.22 |
| 7,518,550 B1 * | 4/2009 | Bhogal | ............... | G01S 19/38 342/357.22 |
| 7,778,625 B2 * | 8/2010 | Yamauchi | ............... | H04M 1/72536 340/292 |
| 7,966,025 B1 * | 6/2011 | O'Neil | ............... | H04W 48/04 455/404.2 |
| 8,126,445 B2 * | 2/2012 | Kennedy | ............... | H04M 1/66 455/418 |
| 8,275,348 B2 * | 9/2012 | Yen | ............... | H04M 1/6075 340/576 |
| 8,527,013 B2 * | 9/2013 | Guba | ............... | G08G 1/20 455/41.2 |
| 8,560,645 B2 * | 10/2013 | Linden | ............... | H04L 41/0806 370/310.2 |
| 2003/0036405 A1 * | 2/2003 | Hijii | ............... | H04M 1/6075 455/552.1 |
| 2005/0119002 A1 | 6/2005 | Bauchot et al. | | |
| 2006/0063563 A1 * | 3/2006 | Kaufman | ............... | H04M 1/663 455/556.2 |
| 2008/0243350 A1 * | 10/2008 | Harkness | ............... | B60Q 9/00 701/93 |
| 2009/0215466 A1 * | 8/2009 | Ahl | ............... | H04M 1/66 455/456.1 |
| 2010/0217494 A1 * | 8/2010 | Heft | ............... | B60T 7/22 701/70 |
| 2011/0021234 A1 * | 1/2011 | Tibbitts | ............... | H04W 48/04 455/517 |
| 2011/0063098 A1 * | 3/2011 | Fischer | ............... | G07C 9/00119 340/439 |
| 2011/0117903 A1 * | 5/2011 | Bradley | ............... | H04M 1/6075 455/418 |
| 2011/0244898 A1 * | 10/2011 | Matsui | ............... | H04M 1/72577 455/500 |
| 2011/0263293 A1 * | 10/2011 | Blake | ............... | B60K 35/00 455/557 |
| 2011/0294465 A1 * | 12/2011 | Inselberg | ............... | H04M 1/72577 455/410 |
| 2012/0220264 A1 * | 8/2012 | Kawabata | ............... | G06F 3/04883 455/411 |
| 2013/0122886 A1 * | 5/2013 | Kitaya | ............... | H04M 1/72566 455/418 |
| 2014/0113619 A1 * | 4/2014 | Tibbitts | ............... | G07C 5/008 455/419 |
| 2014/0213234 A1 * | 7/2014 | Inselberg | ............... | H04W 4/021 455/418 |
| 2015/0256669 A1 * | 9/2015 | James | ............... | H04M 1/72577 455/418 |
| 2015/0256999 A1 * | 9/2015 | Doorandish | ............... | H04W 8/22 455/419 |

FOREIGN PATENT DOCUMENTS

| | | |
|---|---|---|
| CN | 101226693 A | 7/2008 |
| CN | 201331844 Y | 10/2009 |
| JP | 2008-128909 A | 6/2008 |

* cited by examiner

CONFIGURABLE TRAFFIC ZONE CONTROL SYSTEM

FIELD

This invention relates to traffic zones and, more particularly, to a method and system for providing a configurable and adjustable speed limit in a traffic zone and for controlling a vehicle's speed and operator cellular communication while in the traffic zone.

BACKGROUND

Bright signs, flashing lights and even a parked motorcycle policeman aren't always enough to stop motorists from speeding through school or construction traffic zones. Furthermore, driver distraction rises due to the proliferate amount of new electronics in automobiles. One of the biggest distractions is texting and/or cellular phone use. Distracted drivers and speeding vehicles pose a significant danger to children in the school traffic zone or workers in the construction traffic zone.

Thus, there is a need to provide a traffic zone control system that regulates vehicle speed by automated controls and regulates cellular wireless transmission in a particular traffic zone.

SUMMARY

An object of the invention is to fulfill the need referred to above. In accordance with the principles of the present invention, this objective is achieved by a configurable traffic zone control system that includes transmitter structure associated with a traffic zone. The transmitter structure includes a transmitter for transmitting a wireless signal indicative of a speed requirement of the traffic zone. Receiver structure is provided in a vehicle for receiving the wireless signal such that based on the wireless signal, the speed of the vehicle is automatically controlled to be at or below the speed requirement while the vehicle is in the traffic zone.

In accordance with another aspect of an embodiment, a method is provided for controlling a vehicle in a particular traffic zone. The method provides transmitter structure associated with the traffic zone. The transmitter structure includes a transmitter for transmitting a wireless signal indicative of a speed requirement of the traffic zone. The wireless signal is received at the vehicle. Based on the wireless signal, the speed of the vehicle is automatically controlled to be at or below the speed requirement while the vehicle is in the traffic zone.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
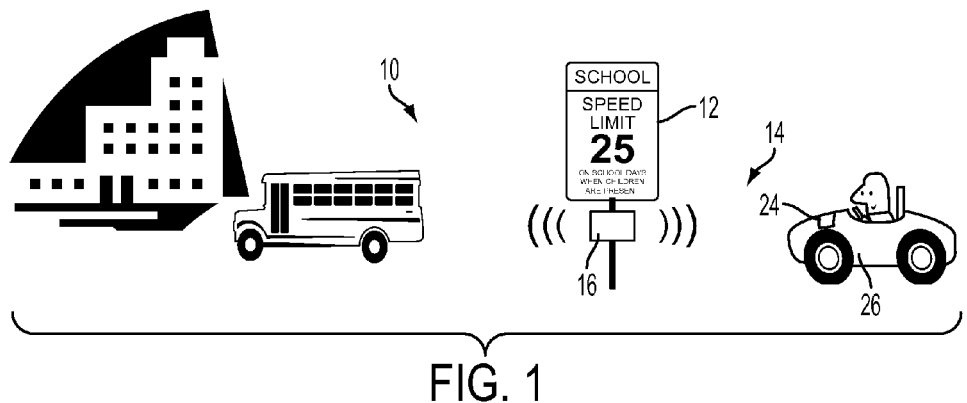
FIG. 1 is a schematic diagram of a school traffic zone employing a configurable traffic zone control system in accordance with an embodiment.
Figure 2:
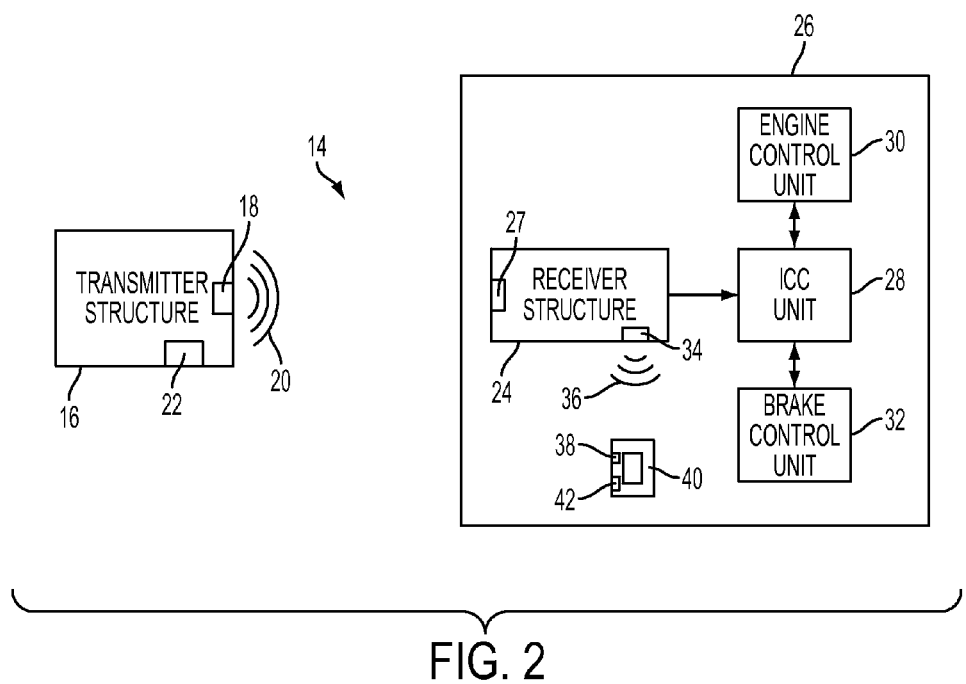
FIG. 2 is a block diagram of the configurable traffic zone control system employed in FIG. 1.

With reference to FIG. 1, a school traffic zone 10 includes a speed limit sign 12 to indicate the legal speed limit through the zone 10 when school is in session. In accordance with an embodiment, a configurable traffic zone control system, generally indicated at 14 is provided. As best shown in FIG. 2, the system 14 includes transmitter structure 16 associated with the traffic zone 10. The transmitter structure 16 is preferably mounted on or adjacent to the speed limit sign 12 or is mounted anywhere in or near the traffic zone 10. The transmitter structure 16 includes a transmitter 18 for transmitting a wireless signal 20 indicative of a speed requirement of the traffic zone 10. The signal 20 can be transmitted, for example by using radio frequency (RF), infrared (IR), or cellular wireless communication. The transmitter structure 16 also includes a processor 22 that can be programmed to set the speed requirement of the speed zone 10 so as to be configurable as to the time of day, multiple enforcements during the day, calendar days, and/or to special events.

With reference to FIG. 2, the system 10 also includes receiver structure 24 disposed in a vehicle 26 that includes a receiver 27 for receiving the signal 20 from the transmitter structure 16 as the vehicle 26 approaches and enters the traffic zone 10. The receiver structure 24 electrically communicates with an intelligent cruise control (ICC) unit 28 of the vehicle 26 that communicates with the engine control unit (ECU) 30 and the brake control unit 32 of the vehicle 26 to automatically control the speed of the vehicle 26 so as to operate at or below the speed requirement of the traffic zone 10. Such speed control can be implemented, for example, in the manner disclosed in U.S. Patent Application Publication No. 20100217494A1, the content of which is hereby incorporated into this specification by reference.

Thus, the receiver structure 24 will receive the wireless signal 20 containing data for the speed limit in the traffic zone 10 and the ICC unit 28 will control the ECU 30 and brake unit 32 to correct and slow the vehicle 26 per the adjustable periods programmed into the transmitter structure 16. In addition, if a cellular call is in process while the vehicle 26 is approaching and entering the protected zone 10, the system 14 will place the call on hold and send a notification message (preferably a voice message) to the other party that the call is on hold and will resume when the vehicle 26 leaves the protected zone 10. Emergency calls would be allowed in case of emergencies.

Placing the call on hold or preventing texting while entering the traffic zone 10 can be implemented by the signal 20 activating a signal broadcasting system 34 in the vehicle 26 that emits a wireless signal 36 received by a sensor 38 in the cellular device 40 such as the driver's cell phone or the vehicle's telematics system. The sensor 38 processes the signal 36 to place the call on hold or prevents texting until the signal 20 is no longer received, due to exiting the traffic zone 10. An example of such a signal broadcasting system 34 and its function is disclosed in U.S. Patent Application Publication No. 20110294465A1, the content of which is hereby incorporated by reference into the present specification. Alternatively, the signal 20 can be received directly by the telematics system 40 that is capable of receiving and placing cellular calls. The telematics system 40 can process the signal 20 to place a cellular call on hold (and can provide notification to the other party) until signal 20 is no longer received. The receiver structure 24 can be part of the telematics system 40.

Mechanisms suitable for carrying out the signal broadcasting function can include any one of the following: (i) a wire loop antenna embedded in the driver-side doorframe and configured to broadcast a modulated radio frequency signal to a sensor comprised of a radio frequency receiving antenna in the cell phone; (ii) a short range, Bluetooth®-modulated signal generator mounted in or near the driver-side doorframe that broadcasts a low signal power modulated signal adapted to be received by a Bluetooth®-enabled cell phone; or (iii) a modulated infrared signal generator mounted on or near the driver-side doorframe that transmits a signal to a sensor comprised of an infrared receiver in the cell phone. The infrared signal based system requires a line of visibility of the cell phone to the signal broadcasting device. An article of clothing may not adequately shadow the signal from getting through to the cell phone and will still enable the turning off the cell phone text messaging functionality. Each of the foregoing communication mechanisms provides for a suitable modulation to form an identifiable, predetermined characteristic transmitted signal.

The Bluetooth® protocol, promulgated by the Bluetooth Special Interest Group (SIG) trade association, provides a standard widely used for short-range, bi-directional wireless communication between electronic devices. This creates a piconet of personal area network accessed by many users and various devices. Many current cell phones include Bluetooth® capabilities, which are most commonly used to permit wireless communication between the phone and a small headset providing a microphone and an earphone for hands-free telephone conversation.

Other forms of wireless, electromagnetic transmission that permit signals to be exchanged between the cell phone and hardware present in the vehicle can also be used to implement the signal broadcasting function used in the present system and method.

Optionally, the broadcast signal includes one or more static or dynamically-generated security authentication codes to provide an additional measure of security and reliability in automatically causing the text messaging functionality of a cell phone to be turned off and on as a driver respectively gets into and out of an automobile through the front, driver-side door. Preferably, the one or more security codes are stored in a random access memory of the cell phone and in the memory of the signal broadcasting system.

The signal broadcast system preferably is configured to broadcast within a range such that only cell phones extant near the driver-side door of the automobile receive and respond to the deactivation/activation signal. Consequently, cell phones brought into the automobile through other doors, such as those utilized by the passengers in an automobile, will not have their text messaging functionality affected.

Thus, when a driver enters the automobile through the driver-side door, the broadcast signal system is activated and sends a low power, local signal to the cell phone. This signal broadcasting system is local, meaning that it is only effective at or near the front, driver-side door of the automobile. Without being bound by any theory, it is believed that in the case of the modulated radio frequency signal of the first embodiment, the coil configuration focuses the modulated radio frequency signal within the doorframe of the driver-side door. The return path of the magnetic flux field passes through the ferromagnetic doorframe. Hence, the signal broadcast is too weak to be effective elsewhere, such as at the door opening directly behind the driver-door opening. With this arrangement, the text messaging functionality is not deactivated for cell phones passed through any of the doors of the automobile other than the driver-side door.

A sensor within the cell phone receives the broadcast signal and processes the signal to turn off the cell phone's text messaging capability when the driver that carries it enters the vehicle through the driver-side door. When the driver exits, the text messaging function is re-enabled.

Typically the functioning of a cell phone is controlled by a central processing unit (CPU), which may take the form of a microprocessor, a microcontroller, or an application-specific integrated circuit. The cell phone normally includes an internal memory, which is often implemented using semiconductor flash or random access memory. Other memory forms, including magnetic and magnetooptical memories, may also be used.

There is a small chance that a passenger may possess a cell phone whose text messaging functionality has not disabled, and may pass that cell phone to a driver. This behavior is discouraged by an optional feature of the signal broadcasting system. As noted, the signal broadcasting system broadcasts a simple signal to sequentially turn the texting feature off and on. The signal broadcasting system optionally includes one or more security authentication codes in the signal it broadcasts. This authentication code may be dynamically generated. That is to say, every other time the signal broadcasting system is activated, it selects a new security authentication code and stores it in a memory storage unit incorporated in the automobile signal broadcast system. This code may be generated at random or selected sequentially or randomly from a finite repertoire of stored, predetermined choices. At the next activation, when the driver opens the door to exit the vehicle, the signal broadcast system again includes the same security authentication code in its transmission. In a similar manner, the cell phone also stores the security authentication code in its internal memory; upon receipt of the second signal from the signal broadcasting unit, the CPU compares the new authentication code with the first, stored code, and reactivates the cell phone text messaging function if the codes match.

The status of the cell phone's text message deactivation function is optionally indicated by indication means, such as indicator lights associated with either or both of the vehicle and the cell phone itself. After the signal broadcasting system is activated and the cell phone is passed through the driver-side automotive door, these indicator lights, if present, are both illuminated. Thereafter, when the driver exits the driver-side automobile door, the signal broadcasting system is again activated and the cell phone passes through the driver-side automobile door for a second time, and in response, both indicator lights are turned off, indicating that the system is ready to communicate with this or another cell phone and to cause deactivation of its text messaging functionality.

If a passenger passes a cell phone to the driver and the driver then exits the driver-side door with a passenger's telephone, its cell phone text messaging capability will be turned off. In that case, the system may consider this as a second passage of the driver's cell phone, which has the indicator light lit and which, when contrary to the dashboard indicator light, indicates that there is a problem within the system. The signal broadcasting system has to be reset by pushing a reset button. The driver's cell phone, as well as the passenger's cell phone, may have to be initialized to erase the phone's internal memory. This may be done by removing the battery or activating a reset function, such as by entering one or more pre-selected keystrokes on the phone's keypad, which causes the phone's internal memory to be reset. Both actions require some effort and would likely discourage a passenger from passing a cell phone with an enabled text messaging, function to the driver. Instead, the driver will choose to request the passenger to send a text message to the party involved in lieu of the driver, and this action increases the safety margin for both the driver and others on the road.

The system 14 provides a configurable and adjustable speed limit zone. As noted above, the speed limit in the zone 10 can be varied by time of day and by calendar days, or can be configured as the user desires. Thus, the system 14 can control the speed zone 10 only during days school is in session and/or when children are present.

Although the system 14 has been described for use in a school traffic zone, it can be appreciated that the system 14 can be used in construction traffic zone, near day care centers, or in any traffic zone that requires the driver to reduce the vehicle's speed.

Since many vehicles have on-board GPS mapping systems that knows that the vehicle is near a school, the GPS mapping system 42 (as part of the telematics system 40) can be configured to map the school traffic zone. Thus, the on-board GPS mapping system 42 can include the receiver structure 24, or the function thereof, and receive the signal 20 from the transmitter structure 16 at the GPS location of the school, day care center, etc. and initiate the vehicle speed and cell device control as described above.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of controlling wireless communications devices located in a vehicle, when the vehicle is in a particular traffic zone, the method comprising:
    receiving at a first receiver in the vehicle, a first wireless signal, which is transmitted from a first transmitter at a location inside the particular traffic zone, the first wireless signal indicative of the existence of the particular traffic zone;
    receiving the first wireless signal at a wireless communications device disabler located in the vehicle, the wireless communications device disabler being configured to receive the first signal and broadcast a different second signal, which when received by a wireless communications device that is configured to receive the second signal, disables said wireless communications device;
    selectively broadcasting in the vehicle, the second wireless signal from the wireless communications device disabler, responsive to receiving the first wireless signal, the second wireless signal being broadcast by a second transmitter comprising the wireless communications device disabler and, which is also in the vehicle; and
    detecting the second wireless signal at a wireless communications device located in the vehicle, the wireless communications device being configured to be disabled responsive to receipt of the second wireless signal by said wireless communications device;
    wherein the first wireless signal does not include location information of the particular traffic zone.

2. The method of claim 1, wherein the step of at least partially disabling the wireless device comprises preventing texting while the vehicle is in the particular traffic zone.

3. The method of claim 1, wherein the first second wireless signal is not transmitted via a cellular communication.

4. The method of claim 1, wherein the step of detecting the second wireless signal at a wireless communications device comprises detecting the second wireless signal by a sensor in a driver's cell phone.

5. The method of claim 1, wherein the step of at least partially disabling the wireless device comprises placing a call on hold while the vehicle is in the particular traffic zone.

6. The method of claim 1, further comprising: allowing emergency calls while the vehicle is in the particular traffic zone.

7. The method of claim 1, further comprising: selectively transmitting the first wireless signal based on time of day and/or calendar days.

8. The method of claim 1, wherein the vehicle includes a telematics system including a global positioning system (GPS), the method further comprising: determining a position of the vehicle via the GPS, and if the position of the vehicle is in the traffic zone, receiving the second wireless signal.

9. A configurable traffic zone control system for a wireless communications devices inside a motor vehicle, the traffic zone control system comprising:
    a first receiver located in a vehicle, the first receiver configured to receive a first wireless signal transmitted from a traffic zone transmitter, the first wireless signal indicating to the first receiver, the existence of a particular traffic zone but not indicating a geographic location of the traffic zone;
    a second signal broadcasting system coupled to the first receiver, the second signal broadcasting system configured to transmit a second wireless signal to a driver's cellular communications device within the vehicle, responsive to receipt of the first wireless signal by the first receiver, the second wireless signal being configured to cause the driver's cellular communications device within the vehicle to be at least partially disabled upon receipt of the second wireless signal.

10. The system of claim 9, wherein the second signal broadcasting system is configured to transmit a second wireless signal that prevents texting using a cellular communications device, while the vehicle is within the particular traffic zone.

11. The system of claim 9, wherein the second signal broadcasting system is configured to transmit a second wireless signal that places a cellular call on hold while the vehicle is in the particular traffic zone.

12. The system of claim 9, wherein the vehicle includes a global positioning system (GPS) constructed and arranged to determine if the vehicle is in the traffic zone.

* * * * *